(12) United States Patent
Mousques

(10) Patent No.: US 8,801,437 B2
(45) Date of Patent: Aug. 12, 2014

(54) PEDAGOGICAL DEVICE FOR INCISIONS AND SUTURES

(76) Inventor: Thierry Mousques, Paris (FR)

( * ) Notice: Subject to any disclaimer, the term of this patent is extended or adjusted under 35 U.S.C. 154(b) by 130 days.

(21) Appl. No.: 13/145,855

(22) PCT Filed: Jan. 25, 2010

(86) PCT No.: PCT/FR2010/050106
§ 371 (c)(1),
(2), (4) Date: Aug. 3, 2011

(87) PCT Pub. No.: WO2010/086542
PCT Pub. Date: Aug. 5, 2010

(65) Prior Publication Data
US 2011/0281251 A1    Nov. 17, 2011

(30) Foreign Application Priority Data
Jan. 27, 2009   (FR) ...................... 09 50489

(51) Int. Cl.
G09B 23/28    (2006.01)

(52) U.S. Cl.
USPC ........................................ 434/263

(58) Field of Classification Search
USPC ................ 434/262, 263, 267, 274
See application file for complete search history.

(56) References Cited

U.S. PATENT DOCUMENTS

| | | | | |
|---|---|---|---|---|
| 1,034,297 A | * | 7/1912 | Priest | 434/263 |
| 2,780,002 A | * | 2/1957 | Shea et al. | 434/263 |
| 3,458,936 A | * | 8/1969 | Tuccillo et al. | 434/263 |
| 3,886,661 A | * | 6/1975 | Neill | 434/263 |
| 4,115,922 A | | 9/1978 | Alderman | |
| 4,242,812 A | * | 1/1981 | Randoll et al. | 434/263 |
| 5,030,102 A | * | 7/1991 | Lang | 434/263 |
| 5,120,229 A | * | 6/1992 | Moore et al. | 434/263 |
| 5,232,370 A | * | 8/1993 | Hoye | 434/263 |
| 5,320,529 A | * | 6/1994 | Pompa | 433/76 |
| 6,257,895 B1 | * | 7/2001 | Oestreich | 434/274 |
| 7,037,111 B2 | * | 5/2006 | Miller | 433/213 |
| 7,537,455 B2 | * | 5/2009 | Cope | 434/263 |
| 7,713,064 B2 | * | 5/2010 | Schulz | 434/263 |
| 8,376,754 B2 | * | 2/2013 | Segal et al. | 434/263 |
| 2007/0166665 A1 | | 7/2007 | Cope | |
| 2007/0178429 A1 | | 8/2007 | Bell | |

FOREIGN PATENT DOCUMENTS

DE    94 00 136 U1    12/1994

OTHER PUBLICATIONS

International Search Report as issued for PCT/FR2010/050106.

* cited by examiner

*Primary Examiner* — Kurt Fernstrom
(74) *Attorney, Agent, or Firm* — Pillsbury Winthrop Shaw Pittman LLP

(57) ABSTRACT

A pedagogical device for incisions and stitches for practicing different incision and stitching techniques in human or animal surgery includes a bar having an upper portion having a surface with a convex shape representing an anatomic element such as a bone, an upper maxillary or a mandible, and a sheet covering the bar, the sheet being made of a material having a texture simulating a biological tissue. The device can be directly used in the field of teaching surgery.

23 Claims, 2 Drawing Sheets

PEDAGOGICAL DEVICE FOR INCISIONS AND SUTURES

CROSS-REFERENCE TO RELATED APPLICATIONS

This application is the U.S. National Stage of PCT/FR2010/050106, filed Jan. 25, 2010, which in turn claims priority to French Patent Application No. 0950489, filed Jan. 27, 2009, the entire contents of all applications are incorporated herein by reference in their entireties.

The present invention relates to a pedagogical device for incisions and sutures.

More particularly, the present invention relates to a pedagogical device for incisions and sutures enabling incisions and sutures performed in human or animal surgery and more precisely in dental surgery to be practiced.

The success of a surgery depends, in large part, on the meticulous execution of the incisions and sutures performed.

In fact, during a surgery, the first step consists of making a precise incision and ending the incision with sutures.

Once the surgery is completed, the practitioner should make a precise and atraumatic closure of the wound. The sutures terminate the operation. Sutures enable the flaps of the wound to be positioned correctly and must ensure their correct adjustment to, in particular, promote cicatrization and reduce postoperative complications.

Multiple incision techniques and sutures are acquired only through practice and represent essential steps in surgery.

Because of this, practitioners and students practice, as much as possible, on pedagogical devices generally formed by models in plastic material that are covered with elastomer, enabling biological tissues to be simulated. These biological tissues are conventionally made by molding type processes of the injection, compression or rotational casting type.

The complexity of production of these biological tissues necessarily is reflected in the sales price of such pedagogical devices. Consequently, universities have a very small quantity of pedagogical devices. Consequently, we have to conclude that many practitioners start their careers without having benefited from having practical, appropriate ex-vivo experience.

In addition, it's not unusual that some surgical failures are due to poorly executed incisions and/or sutures, consequently leading to a somewhat imprecise wound closure which generates infection or complications.

In addition, the materials used for manufacturing the biological tissues of current pedagogical devices are highly resistant to perforation. Because of this, students or practitioners may prick themselves or even cut themselves during their training.

In this context, the invention aims to propose a device free from the aforementioned problems so as to provide the teaching, medical, dental and veterinary professions as well as students with inexpensive pedagogical devices that reproduce, under favorable conditions, the anatomy such that practitioners and future practitioners may benefit from suitable practical teaching.

In addition, the invention also aims to reduce the number of bodily accidents produced during the training phase.

For this purpose, the object of the invention applies to a pedagogical device for incisions and sutures for practicing different techniques performed in surgery, characterized in that said device comprises:

a bar presenting an upper part having a convex shape representing an anatomical element;

a sheet covering said bar; said sheet being made of a material presenting a texture for simulating a biological tissue.

For the sake of clarity, anatomical element is understood to refer to a bone, vessel, artery, upper maxillary or mandible.

In addition, the material of said sheet is understood to refer to a material that is pierceable, elastic and resistant to tearing. This material may be constituted of elastomer, imitation leather, fabric, plastic or any other material.

Outside the main characteristics that have just been mentioned in the previous paragraph, the device according to the invention may present one or more of the additional characteristics below, considered individually or according to any technically possible combinations:

said device comprises at least one block disposed on said upper part of said bar or on a lateral face of said bar;
said device comprises a support plate, said bar being fixed on said support plate;
said device comprises a support plate, said bar being detachably mounted on said support plate;
the material of said sheet may be chosen from among the following materials:
elastomer;
imitation leather;
fabric; or
plastic;
said bar comprises at least one hole for inserting said at least one block;
said at least one block is fixed on said bar;
said at least one block is detachably mounted on said bar;
said at least one block is in one piece with said bar;
said sheet has a thickness of between 0.1 and 5 mm and preferentially on the order of 0.7 mm;
said at least one sheet is detachably mounted on said bar;
said bar, said support plate and said at least one block are formed in one piece.

Other characteristics and advantages of the invention will clearly emerge from the description given below, for indicative and in no way limiting purposes, of the embodiments referring to the attached figures, in which.

For reasons of clarity, elements appearing in different figures have been designated by similar references. Furthermore, only elements helpful for understanding the invention have been represented, without respect for scale and the schematic manner.

Figure 1:
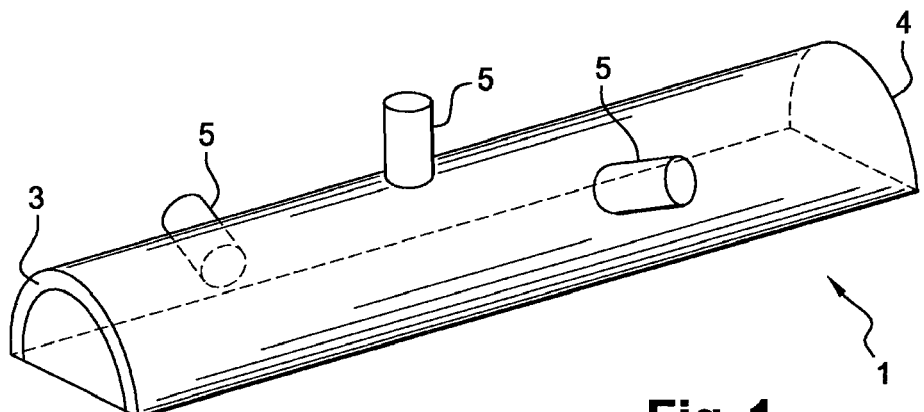
FIG. 1 represents an example of the device in conformance with the invention.

FIG. 1 represents a pedagogical device 1 for incisions and sutures for practicing different incision and suture techniques performed in surgery, subsequently called device 1 for the rest of the description, comprising:

a bar 4 forming a bone, an upper maxillary or a mandible;
a sheet 3 having properties similar to those of any biological tissue such as, for example, gums; and
three blocks 5, such as for example pins, forming models of teeth.

Bar 4 such as illustrated in FIG. 1 is a straight bar whose lower part is substantially rectangular and the upper part is domed with a convex surface (here substantially circular). It is understood that this geometry is not limitative. Thus, the section of this bar 4 may be circular, rectangular, trapezoid, triangular or any other type of geometric shape. In addition, the latter may have an upper part in a flat, convex, triangular or other shape.

This bar 4 allows a bone, such as, for example, an upper maxillary or mandible, to be represented. To do this, the material used is resistant to deformation and may be, in particular, a polymer, a metal, wood or any other type of material.

Bar 4 is covered with a sheet 3 representing a biological tissue such as, for example, gums, whose thickness is between 0.1 and 5 mm. Preferentially, this thickness is on the order of 0.7 mm.

This sheet 3 may be fixed on bar 4 by any type of means, such as for example, welding, bonding, screwing, magnetization, etc.

Sheet 3 has properties similar to those of skin, vessels or gums enabling, on the one hand, it to be incised by using a surgical instrument and/or, on the other hand, it to be perforated by using a filiform instrument of the needle type.

In addition, device 1 according to the invention comprises three blocks 5 enabling the teeth usually found on the upper maxillary and mandible to be represented. It is understood that the number of blocks 5 is given here by way of example.

These blocks 5 are representative of human or animal teeth formed, for example, by pins, studs or screws. Blocks 5 may be made of wood, composite material, earthenware, metal or any other type of material. Furthermore, the latter may be oblong, triangular, rectangular or any other shape.

When blocks 5 represent teeth, they may be situated on the upper part of bar 4 in conformity with human or animal anatomy, but positioning the blocks on the lateral faces of bar 4 may also be considered. In general, these blocks 5 may be positioned perpendicularly or in an inclined manner.

An additional possibility offered by the invention consists of adding different elements to bar 4, which may be representative of a blood vessel, a nerve or any other type of anatomical element.

In the aforementioned example, blocks 5 are assembled on bar 4 by bonding, screwing or any other means enabling blocks 5 to form an integral part with bar 4. It is understood that these blocks 5 and bar 4 may also form a single piece, i.e., may be in one piece.

In other words, as illustrated in FIG. 1, device 1 represents an anatomical element such as a partially edentulous jaw mainly enabling students and practitioners to practice surgery.

Figure 2:
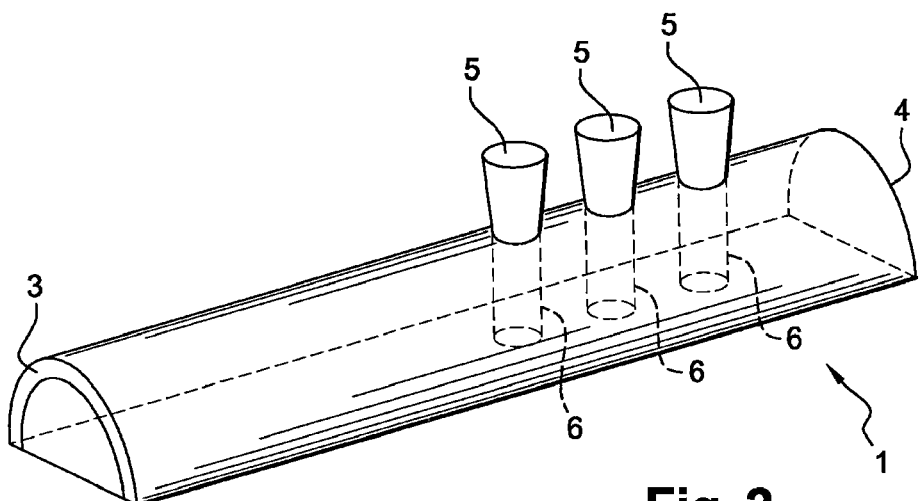
FIG. 2 represents an additional example of the device according to the invention.

Compared with FIG. 1, FIG. 2 represents an additional variation of the invention also comprising:
- bar 4 forming the upper maxillary or mandible;
- sheet 3 having properties similar to those of any biological tissue such as, for example, the gums; and
- three blocks 5, such as for example pins, forming models of teeth. The conical shape of blocks 5 also enables dental crowns to be represented.

Bar 4 and sheet 3 are similarly perforated in order to enable blocks 5 to be positioned in holes 6.

Consequently, blocks 5 may be fitted, fixed and then removed.

Particularly, such an arrangement gives the user the possibility of representing a dentulous, edentulous and/or perforated jaw. More precisely, the user may simulate the presence or absence of teeth (blocks 5) through the gums (sheet 3) or more generally, the user may simulate any sort of wound or tissue tearing.

These holes 6 may be situated on the lower and upper faces and/or on the lateral faces of bar 4.

Figure 3:
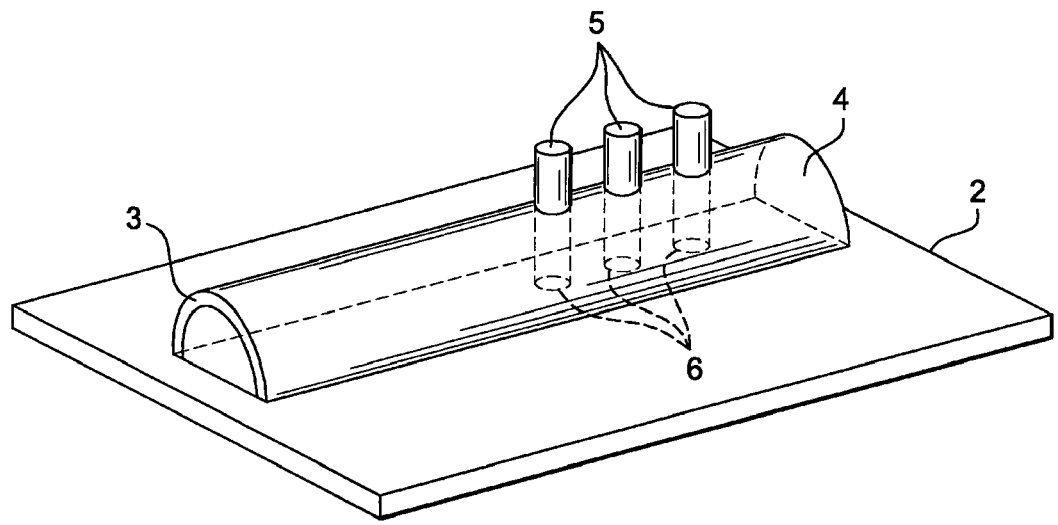
FIG. 3 represents an example of the stabilized device in conformance with the invention.

An additional possibility offered by the invention is illustrated in FIG. 3. Compared with FIGS. 1 and 2, the invention also comprises a support plate 2 ensuring stability of bar 4.

By way of non-limiting example, the support plate 2 may be formed by a plate, a bench, a vise, a table or any other element enabling said bar 4 to be stabilized. Support plate 2 may be in a composite material, metal, wood, elastomer or any other type of material.

In addition, support plate 2 may be covered with any material, such as for example a nonslip material.

Other than this stability given to bar 4, the support plate 2 enables the space for performing surgeries to be limited.

Thus, the user is found in conditions that are almost similar to reality.

Figure 4:
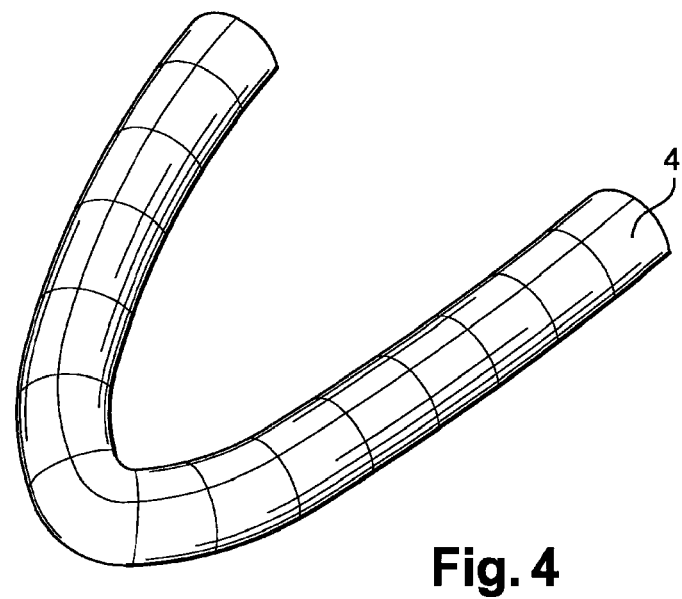
FIG. 4 represents an example of a maxillary or mandible used in the device according to the invention.

In addition, FIG. 4 illustrates a bar 4 with a curvature substantially similar to that of a mandible, i.e., in a horseshoe shape, and having, moreover, a substantially triangular section.

In addition, according to a variation of the invention that is not illustrated, sheet 3 may be replaced by a new sheet 3 after each use, so as to not discard device 1.

According to an additional possibility offered by the invention, sheet 3 represents the wall of a blood vessel and bar 4 is used as a support for said sheet 3. In this context, sheet 3 has properties similar to the wall of a blood vessel.

In addition, in a non-limiting manner, bar 4 may represent a bone such as, for example, the femur. Sheet 3 then has properties similar to those of the epidermis.

In summary, device 1 of the invention particularly has the advantage of offering the possibility to students and practitioners in dental, human or animal medical surgery to practice different incision and suture techniques such as, for example:
- noncontinuous sutures;
- O sutures;
- figure-of-eight sutures;
- vertical and horizontal mattress sutures;
- cross stitching;
- continuous sutures.

The invention is described in the previous by way of example. It is understood that the person skilled in the art can make different variations of the pedagogical device for incisions and sutures, particularly relating to the material, thickness, arrangement, shape or layout of different elements constituting said device without necessarily departing from the scope of the patent.

The invention claimed is:

1. A pedagogical device for incisions and sutures for practicing different incision and suture techniques performed in human or animal surgery, the device comprising:
   a bar presenting an upper part having a convex outer surface representing an anatomical element, said bar extending from a first to a second extremity along a direction, wherein a section of said bar perpendicular to said direction and along substantially a length of said bar from the first to the second extremity has an outer periphery on said convex outer surface that is a portion of a circle, a rectangle, a trapezoid or a triangle;
   a sheet removably attached to the bar covering said outer surface of the bar, said sheet being made in a material having a texture for simulating a biological tissue.

2. The device according to claim 1, comprising at least one block disposed on said upper part of said bar or on a lateral face of said bar.

3. The device according to claim 1, comprising a support plate, said bar being fixed on said support plate.

4. The device according to claim 1, comprising at least one block disposed on said upper part of said bar or on a lateral face of said bar and a support plate, said bar being detachably mounted on said support plate.

5. The device according to claim 2, wherein said bar comprises at least one hole for inserting said at least one block.

6. The device according to claim 2, wherein said at least one block is fixed on said bar.

7. The device according to claim 2, wherein said at least one block is detachably mounted on said bar.

8. The device according to claim 2, wherein said bar, said support plate and said at least one block are in one piece.

9. The device according to claim 1, wherein the material of said sheet includes
an elastomer;
an imitation leather;
a fabric; or
a plastic.

10. The device according to claim 1, wherein said sheet has a thickness from 0.1 to 5 mm.

11. The device according to claim 10, wherein the thickness is about 0.7 mm.

12. The device according to claim 1, wherein the anatomical element is a bone, an upper maxillary or a mandible.

13. The device according to claim 1, wherein the bar represents the anatomical element without replicating the anatomical element.

14. The device according to claim 1, wherein said direction is straight.

15. A pedagogical device for incisions and sutures for practicing different incision and suture techniques performed in human or animal surgery, the device comprising:
a bar presenting an upper part having a convex outer surface representing an anatomical element;
a sheet removably attached to the bar covering said outer surface of the bar, said sheet being made in a material having a texture for simulating a biological tissue, wherein the bar is a straight bar.

16. The device according to claim 15, comprising at least one block disposed on said upper part of said bar or on a lateral face of said bar.

17. The device according to claim 16, wherein said bar comprises at least one hole for inserting said at least one block.

18. The device according to claim 15, wherein the material of said sheet includes
an elastomer;
an imitation leather;
a fabric; or
a plastic.

19. A pedagogical device for incisions and sutures for practicing different incision and suture techniques performed in human or animal surgery, the device comprising:
a bar presenting an upper part having a convex outer surface representing an anatomical element and optionally having at least one cavity formed on the outer surface, said bar extending from a first to a second extremity along a direction, wherein a section of said bar perpendicular to said direction and along a length of said bar from the first to the second extremity and outside said optionally at least one cavity is substantially the same;
a sheet removably attached to the bar covering said outer surface of the bar, said sheet being made in a material having a texture for simulating a biological tissue.

20. The device according to claim 19, comprising at least one block disposed on said upper part of said bar or on a lateral face of said bar.

21. The device according to claim 20, wherein said bar comprises at least one hole for inserting said at least one block.

22. The device according to claim 19, wherein the material of said sheet includes
an elastomer;
an imitation leather;
a fabric; or
a plastic.

23. The device according to claim 19, wherein said direction is straight.

* * * * *